United States Patent
Gwin et al.

(10) Patent No.: US 9,330,081 B2
(45) Date of Patent: May 3, 2016

(54) COMPUTER SYSTEM AND METHOD FOR GENERATING CLIENT-SIDE SOFTWARE DEMONSTRATIONS

(75) Inventors: Aaron J. Gwin, Kirkwood, MO (US); Carl R. Armbruster, Maryland Heights, MO (US); Greg R. Santacruz, St. Louis, MO (US)

(73) Assignee: MasterCard International Incorporated, Purchase, NY (US)

( * ) Notice: Subject to any disclaimer, the term of this patent is extended or adjusted under 35 U.S.C. 154(b) by 400 days.

(21) Appl. No.: 13/021,459

(22) Filed: Feb. 4, 2011

(65) Prior Publication Data

US 2012/0204102 A1    Aug. 9, 2012

(51) Int. Cl.
*G06F 17/27* (2006.01)
*G06F 17/24* (2006.01)
*G06Q 90/00* (2006.01)

(52) U.S. Cl.
CPC .............. *G06F 17/248* (2013.01); *G06Q 90/00* (2013.01)

(58) Field of Classification Search
CPC ....... G06F 8/30; G06F 17/211; G06F 17/248; G06F 17/2235; G06F 17/2247
USPC .......... 715/205, 208, 230, 231, 232, 730, 731
See application file for complete search history.

(56) References Cited

U.S. PATENT DOCUMENTS

| | | | |
|---|---|---|---|
| 6,692,256 B2 * | 2/2004 | Chan et al. | 434/118 |
| 7,062,506 B2 * | 6/2006 | Taylor et al. | |
| 7,487,201 B1 | 2/2009 | Murray et al. | |
| 7,596,620 B1 | 9/2009 | Colton et al. | |
| 7,620,895 B2 * | 11/2009 | Adkins et al. | 715/709 |
| 7,707,505 B1 * | 4/2010 | Ohrt et al. | 715/738 |
| 8,078,960 B2 * | 12/2011 | Chalecki et al. | 715/234 |
| 2004/0003031 A1 * | 1/2004 | Brown et al. | 709/203 |
| 2004/0268225 A1 * | 12/2004 | Walsh et al. | 715/501.1 |
| 2006/0031771 A1 * | 2/2006 | MacHeffner | 715/749 |
| 2006/0047698 A1 | 3/2006 | Fox | |
| 2006/0248453 A1 * | 11/2006 | Bennett et al. | 715/513 |
| 2007/0240131 A1 * | 10/2007 | Sumerlin | 717/139 |
| 2008/0138775 A1 * | 6/2008 | Lee et al. | 434/118 |
| 2009/0172602 A1 | 7/2009 | Chusing et al. | |
| 2009/0300656 A1 * | 12/2009 | Bosworth et al. | 719/320 |
| 2010/0251143 A1 | 9/2010 | Thomas et al. | |

* cited by examiner

*Primary Examiner* — Wilson Tsui
(74) *Attorney, Agent, or Firm* — Armstrong Teasdale LLP

(57) ABSTRACT

A system for demonstrating a server-provided software application using a standalone computing device. The computing device creates a first demonstration page based on a page template. The first demonstration page represents a user interface that is provided by a software application executed by a remote computing device. The first demonstration page is provided to a user. A selection of a navigation element within the first demonstration page is received from the user. In response to the selection of the navigation element, the computing device creates a second demonstration page and provides the second demonstration page to the user.

19 Claims, 9 Drawing Sheets

COMPUTER SYSTEM AND METHOD FOR GENERATING CLIENT-SIDE SOFTWARE DEMONSTRATIONS

BACKGROUND OF THE INVENTION

The field of the present disclosure relates generally to software demonstrations and, more particularly, to a computer-based system and method for demonstrating the operation of client-server software without requiring a connection to a server.

With a general increase in network connectivity, client-server software, such as web browser-based applications, has become widely used. Such software divides functions between a client computer system, operated by a human, and a server computer system, which interacts with the client computer system. For example, the client computer system may include a user interface, and the server computer system may store and retrieve data at the request of the client computer system.

The operation of such client-server systems may be demonstrated to an observer in the context of training and/or marketing. However, such demonstrations require a network connection between the client computer system and the server computer system, just as the case when using the software in a conventional manner. In some scenarios, a network connection between the client computer system and the server computer system is not available. For example, the client computer system may be temporarily located at a site without reliable network connectivity, or the operator of the client computer system may not desire to connect to a network at the site due to security concerns. In another example, access to the server computer system may be restricted by a firewall, such that access from the site where the client computer system is located must be provisioned. This provisioning is associated with manual effort and delay for one-time access.

Accordingly, it would be desirable to provide a computer system that enables a user to demonstrate or simulate a client-server system relationship without requiring a network connection to a server system.

BRIEF DESCRIPTION OF THE INVENTION

In one aspect, a method for demonstrating a software application using a standalone computer device is provided. The computing device creates a first demonstration page based on a page template. The first demonstration page represents a user interface that is provided by a software application executed by a remote computing device. The first demonstration page is provided to a user. A selection of a navigation element within the first demonstration page is received from the user. In response to the selection of the navigation element, the computing device creates a second demonstration page and provides the second demonstration page to the user.

In another aspect, a device for demonstrating a software application is provided. The device includes a memory area, a processor that is coupled to the memory area, and a media output component that is coupled to the processor. The memory area stores a plurality of page templates, wherein each page template corresponds to one or more pages produced by a software application executed by a server computing device. The processor is programmed to create a first demonstration page based on a first page template of the plurality of page templates, and to identify within the first demonstration page a navigation element that, when selected in the software application, initiates a request to the server computing device. The processor is also programmed to modify the first demonstration page such that when the navigation element is selected, a second demonstration page is displayed. The media output component is configured to display the first demonstration page.

In yet another aspect, a non-transitory computer-readable medium that includes computer-executable instructions for demonstrating a software application is provided. The computer-executable instructions are configured to instruct a computer to retrieve from a memory area an ordered list of demonstration pages. The ordered list includes a first demonstration page and a second demonstration page subsequent to the first demonstration page. Each demonstration page in the ordered list is associated with a page template that is stored in the memory area. The computer-executable instructions are also configured to instruct a computer to create the first demonstration page based on a first page template, to display the first demonstration page, and, in response to a selection of a navigation element in the first demonstration page, create the second demonstration page based on a second page template and display the second demonstration page.

DETAILED DESCRIPTION OF THE INVENTION

Figure 1:
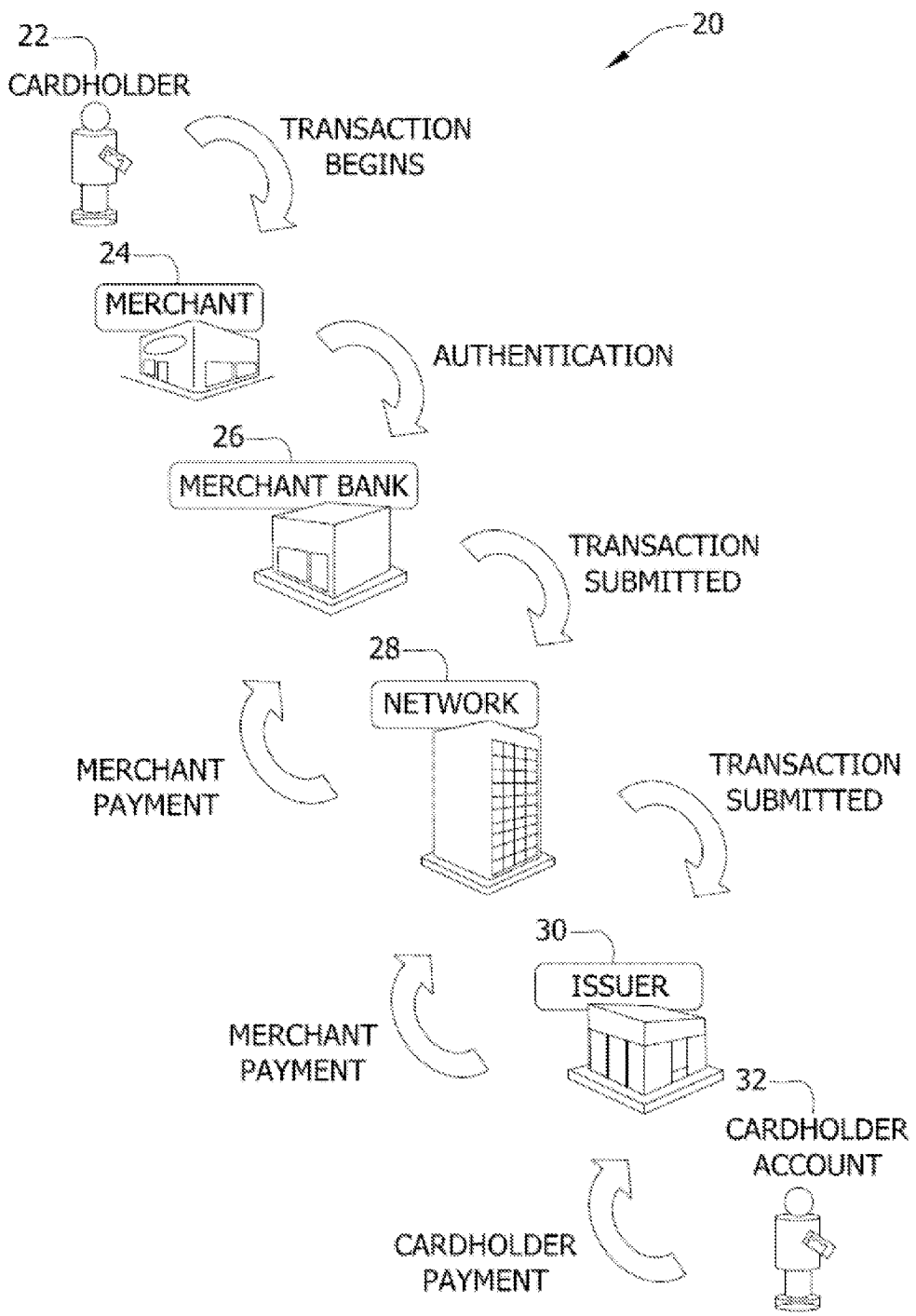
FIG. 1 is a schematic diagram illustrating an exemplary multi-party payment card industry system for enabling ordinary payment-by-card transactions in which the merchants and issuer do not need to have a one-to-one special relationship.

The methods and systems described herein relate to a computer system that is configured to provide a demonstration of client-server software without requiring a network connection to a server computer system. The computer system executes software that mimics behavior of the server computer system including, for example, responding to user actions within a user interface.

Displayed pages are created based on templates, which may be manipulated to create multiple pages. For example, data populated within a page may be defined by an executable "script" that adds predefined data to a portion of the template to create a first page. Similarly, different predefined data may be added to the portion of the template to create a second page.

Examples are provided herein with reference to "pages," which may include documents expressed in Hyper Text Markup Language (HTML), EXtensible HTML (XHTML), and/or EXtensible Markup Language (XML). Such documents may be manipulated through the use of a document object model (DOM). However, the embodiments described are operable with data in any form of expression facilitating the creation of templates and the creation of demonstrations based on such templates.

A technical effect of the systems and processes described herein include at least one of (a) creating a first demonstration page based on a page template, wherein the first demonstration page represents a user interface provided by a software application executed by a remote computing device; (b) providing the first demonstration page to a user; (c) modify the first demonstration page such that when a navigation element in the first demonstration page is selected, a second demonstration page is displayed; (d) receiving a selection of the navigation element from the user; (e) in response to the selection of the navigation element, creating the second demonstration page; and (f) providing the second demonstration page to the user.

In one embodiment, a computer program is provided, and the program is embodied on a non-transitory computer-readable medium. In an exemplary embodiment, the system is executed on a single computer system, without requiring a connection to a server computer system. In a further exemplary embodiment, the system is being run in a Windows® environment (Windows is a registered trademark of Microsoft Corporation, Redmond, Wash.). In yet another embodiment, the system is run on a mainframe environment and a UNIX server environment (UNIX is a registered trademark of AT&T New York, N.Y.). The application is flexible and designed to run in various different environments without compromising any major functionality. In some embodiments, the system includes multiple components distributed among a plurality of computing devices. One or more components may be in the form of computer-executable instructions embodied in a non-transitory computer-readable medium.

The systems and processes described herein for demonstrating the operation of a client-server software are described herein in the context of a computer network configured to process financial transactions such as transactions initiated by a cardholder over an interchange network and/or process financial data. However, the systems and processes are not limited to the specific embodiments described herein. In addition, components of each system and each process can be practiced independent and separate from other components and processes described herein. Each component and process also can be used in combination with other assembly packages and processes.

FIG. 1 is a schematic diagram 20 illustrating an exemplary multi-party payment card industry system for enabling ordinary payment-by-card transactions in which the merchants and issuer do not need to have a one-to-one special relationship. Embodiments described herein may relate to a payment card system, such as a credit card payment system using the MasterCard® interchange network. The MasterCard® interchange network is a set of proprietary communications standards promulgated by MasterCard International Incorporated® for the exchange of financial transaction data and settlement of funds between financial institutions that are members of MasterCard International Incorporated®. (MasterCard is a registered trademark of MasterCard International Incorporated located in Purchase, N.Y.).

In a typical payment card system, a financial institution called the "issuer" issues a payment card, such as a credit card, to a consumer, who uses the payment card to tender payment for a purchase from a merchant. To accept payment with the credit card, the merchant must normally establish an account with a financial institution that is part of the financial payment system. This financial institution is usually called the "merchant bank" or the "acquiring bank" or "acquirer bank." When a consumer 22 tenders payment for a purchase with a credit card (also known as a financial transaction card), the merchant 24 requests authorization from the merchant bank 26 for the amount of the purchase. The request may be performed over the telephone, but is usually performed through the use of a point-of-sale terminal, which reads the consumer's account information from the magnetic stripe, chip, or embossed characters on the credit card and communicates electronically with the transaction processing computers of the merchant bank. Alternatively, a merchant bank may authorize a third party to perform transaction processing on its behalf. In this case, the point-of-sale terminal will be configured to communicate with the third party. Such a third party is usually called a "merchant processor" or an "acquiring processor" or a "third party processor."

Using the interchange network 28, the computers of the merchant bank or the merchant processor will communicate with the computers of the issuer bank 30 to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account 32 is decreased. Normally, a charge for a credit card transaction is not posted immediately to a consumer's account because bankcard associations, such as MasterCard International Incorporated®, have promulgated rules that do not allow a merchant to charge, or "capture," a transaction until goods are shipped or services are delivered. However, with respect to at least some debit card transactions, a charge may be posted at the time of the transaction. When a merchant ships or delivers the goods or services, the merchant captures the transaction by, for example, appropriate data entry procedures on the point-of-sale terminal. This may include bundling of approved transactions daily for standard retail purchases. If a consumer cancels a transaction before it is captured, a "void" is generated. If a consumer returns goods after the transaction has been captured, a "credit" is generated. The issuer bank 30 stores the credit card transaction information, such as the type of merchant, amount of purchase, date of purchase, in a data warehouse.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group. More specifically, a transaction is typically settled between the issuer and the interchange network, and then between the interchange network and the merchant bank (also known as the acquirer bank), and then between the merchant bank and the merchant.

Financial transaction cards or payment cards can refer to credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), and key fobs.

Figure 2:
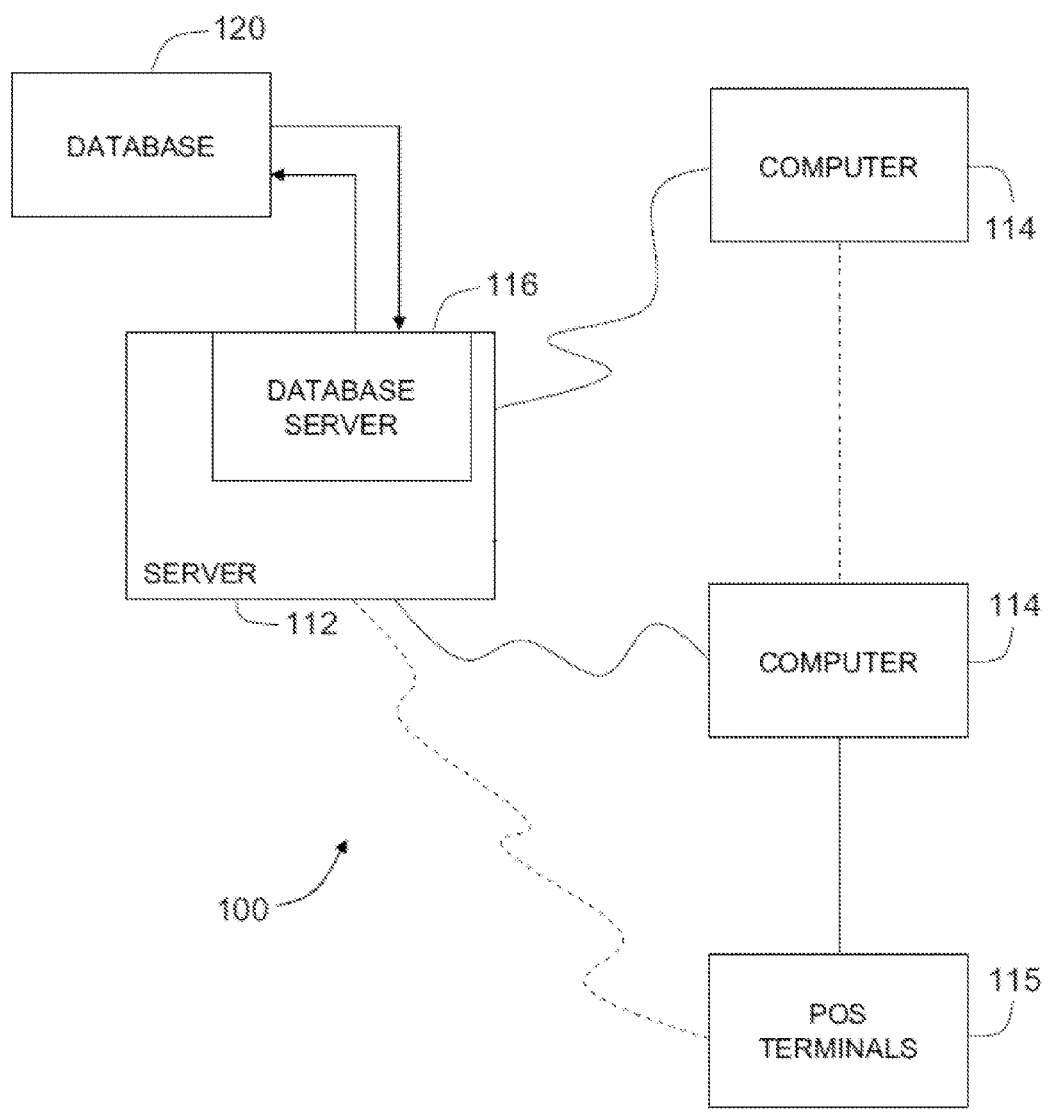
FIG. 2 is a simplified block diagram of an exemplary embodiment of a server architecture of a payment system for processing payment-by-card transactions, in accordance with one embodiment of the present invention.

FIG. 2 is a simplified block diagram of an exemplary payment system 100 for processing payment-by-card transactions, in accordance with one embodiment of the present invention. In one embodiment, system 100 is a payment card system, also referred to as a financial transaction payment system, used for storing transaction data of users, within a payment card program used by cardholder. In another embodiment, system 100 is a payment card system configured to process a transaction initiated by a cardholder using a payment card, determine whether the cardholder engaging in the transaction is registered within the system, store the data related to the transaction, authorize or deny the transaction, and complete the transaction.

More specifically, in the example embodiment, system 100 includes a server system 112, and a plurality of client subsystems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems and special high-speed ISDN lines. Client systems 114 could be any device capable of interconnecting to the Internet including a web-based phone, personal digital assistant (PDA), or other web-based connectable equipment. A database server 116 is connected to a database 120 containing information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

System 100 also includes point-of-sale (POS) terminals 115, which are connected to client systems 114 and may be connected to server system 112. POS terminals 115 are interconnected to the Internet through many interfaces including a network, such as a local area network (LAN) or a wide area network (WAN), dial-in-connections, cable modems and special high-speed ISDN lines. POS terminals 115 could be any device capable of interconnecting to the Internet and includes an input device capable of reading information from a consumer's financial transaction card.

As discussed herein, database 120 stores information relating to cardholders. Database 120 may also store transaction data generated as part of sales activities conducted over the bankcard network including data relating to merchants, account holders or customers, and purchases. Database 120 may also store data relating to merchants, account holders, customers, and purchases. Database 120 may also store data relating to a list of merchants, merchant identifiers, product codes, transaction terms, financing data, and any other data related to operation of system 100. Database 120 may include a single database having separated sections or partitions or may include multiple databases, each being separate from each other.

In the example embodiment, one of client systems 114 may be associated with an acquirer while another one of client systems 114 may be associated with an issuer; POS terminal 115 may be associated with a participating merchant or may be a computer system used by a customer making an on-line purchase or payment; and server system 112 may be associated with the interchange network.

Figure 3:
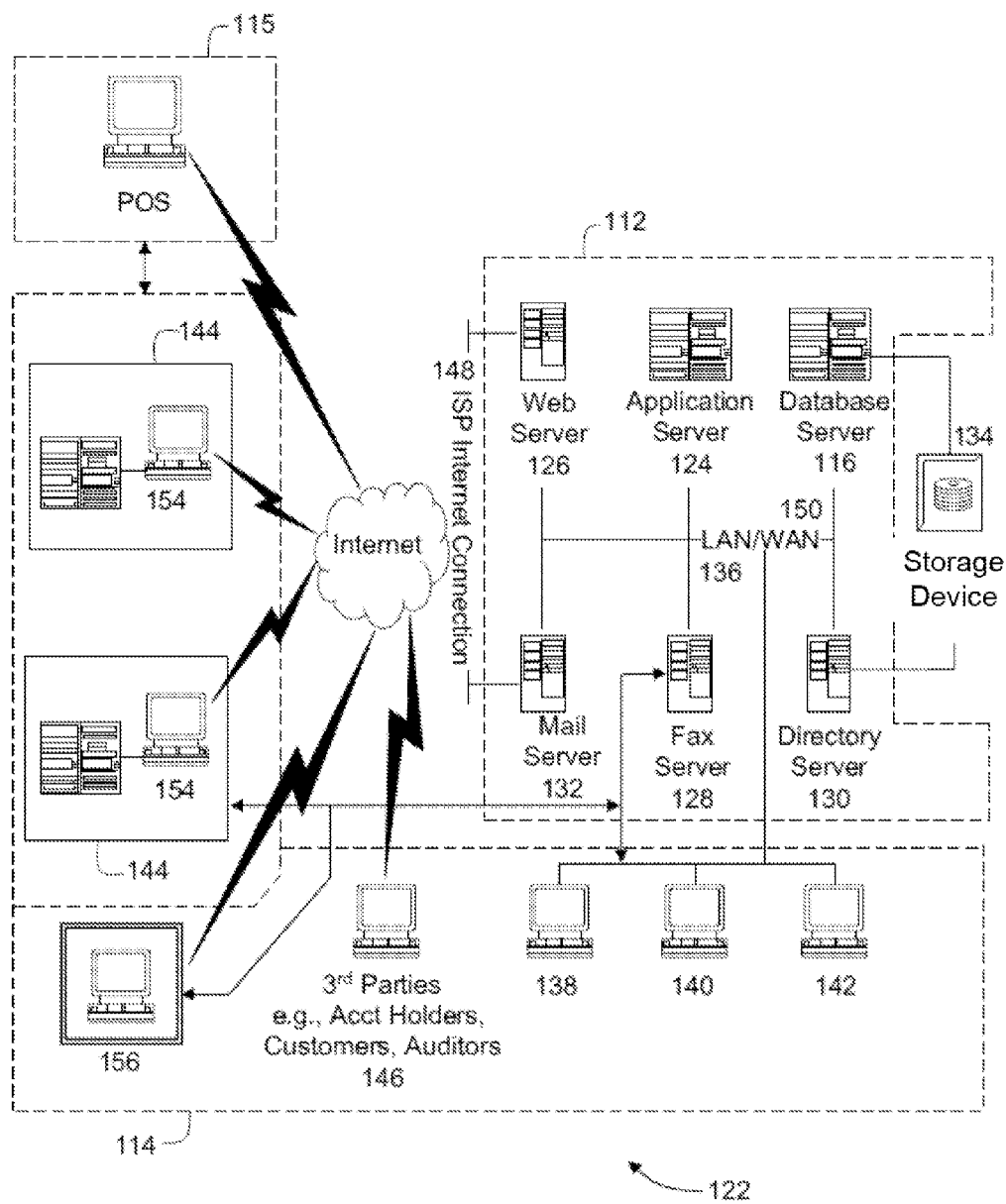
FIG. 3 is an expanded block diagram of an exemplary embodiment of a server architecture of the payment system shown in FIG. 2, in accordance with one embodiment of the present invention.

FIG. 3 is an expanded block diagram of an exemplary embodiment of a server architecture of a payment system 122 for processing payment-by-card transactions, in accordance with one embodiment of the present invention. Components in system 122, identical to components of system 100 (shown in FIG. 2), are identified in FIG. 3 using the same reference numerals as used in FIG. 2. System 122 includes server system 112, client systems 114, and POS terminals 115. Server system 112 further includes database server 116, an application server 124, a web server 126, a fax server 128, a directory server 130, and a mail server 132. A storage device 134 is coupled to database server 116 and directory server 130. Storage device 134 is any computer-operated hardware for storing and/or retrieving data. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Server system 112 not only processes financial transactions, but also provides various services to client systems 114. For example, server system 112 may provide financial transaction reporting and/or fraud prevention services. In some embodiments, such services are provided using a client-server architecture in which a user accesses a service provided by server system 112 via a client system 114. For example, the client system 114 may issue requests and/or commands to server system 112 based on user actions, receive a response from server system 112, and present information to the user based on the response.

As described in more detail below, embodiments provided herein simulate interaction between the client system 114 and server system 112 to demonstrate a service provided by server system 112. Such embodiments allow a user 201 to evaluate operation of the service without requiring a communication channel between the client system 114 and server system 112. The evaluation of the service may be useful for marketing (e.g., as part of a sales presentation), usability analysis, testing, and/or any other activity that may benefit from an interactive software demonstration.

Figure 4:
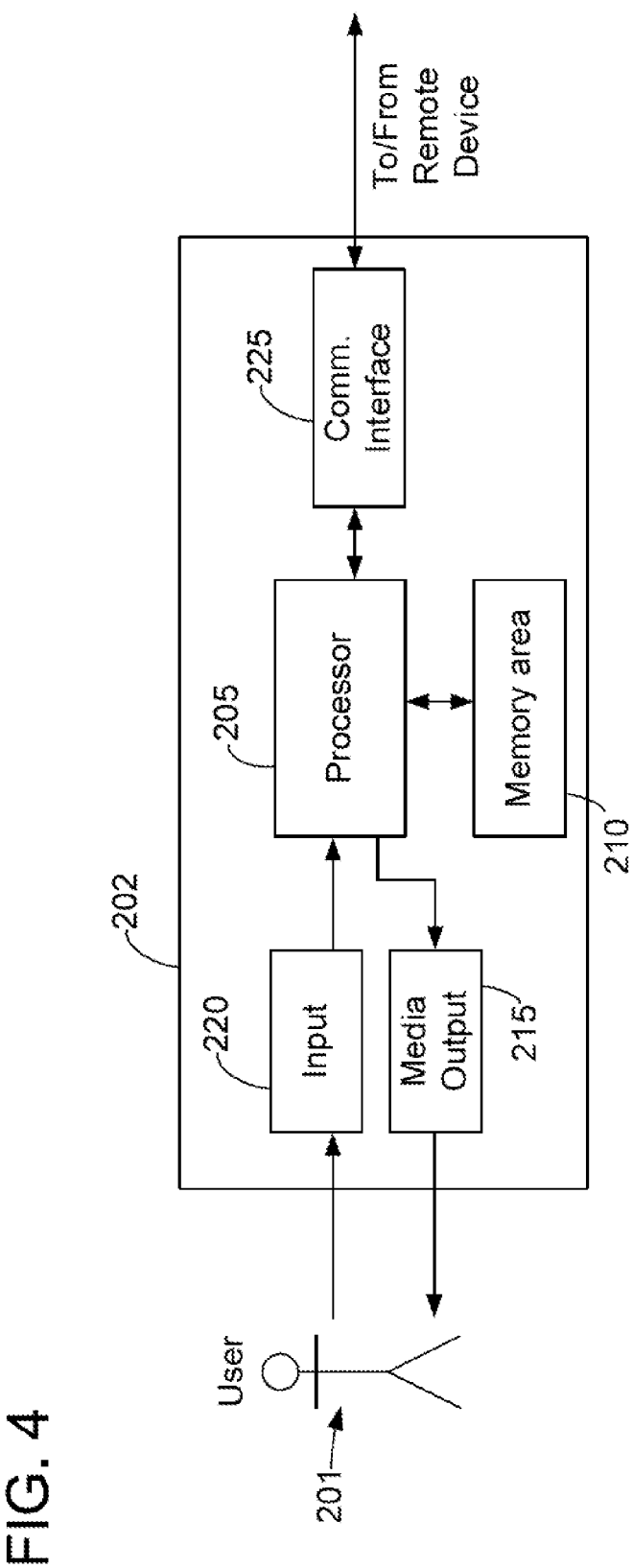
FIG. 4 illustrates an exemplary configuration of a user computing device, such as the client system shown in FIGS. 2 and 3.

FIG. 4 illustrates an exemplary configuration of a user computing device 202 operated by a user 201. User computing device 202 may include, but is not limited to, client systems 114, 138, 140, and 142, POS terminal 115, workstation 154, and manager workstation 156.

User computing device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or written works to be stored and retrieved. Memory area 210 may include one or more computer-readable media.

User computing device 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device (e.g., a liquid crystal display (LCD), organic light emitting diode (OLED) display, or "electronic ink" display) or an audio output device (e.g., a speaker or headphones).

In some embodiments, user computing device 202 includes an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

User computing device 202 may also include a communication interface 225, which is communicatively couplable to a remote device such as server system 112. Communication interface 225 may include, for example, a wired or wireless network adapter or a wireless data transceiver for use with a mobile phone network (e.g., Global System for Mobile communications (GSM), 3G) or other mobile data network (e.g., Worldwide Interoperability for Microwave Access (WIMAX)).

Stored in memory area 210 are, for example, computer-readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
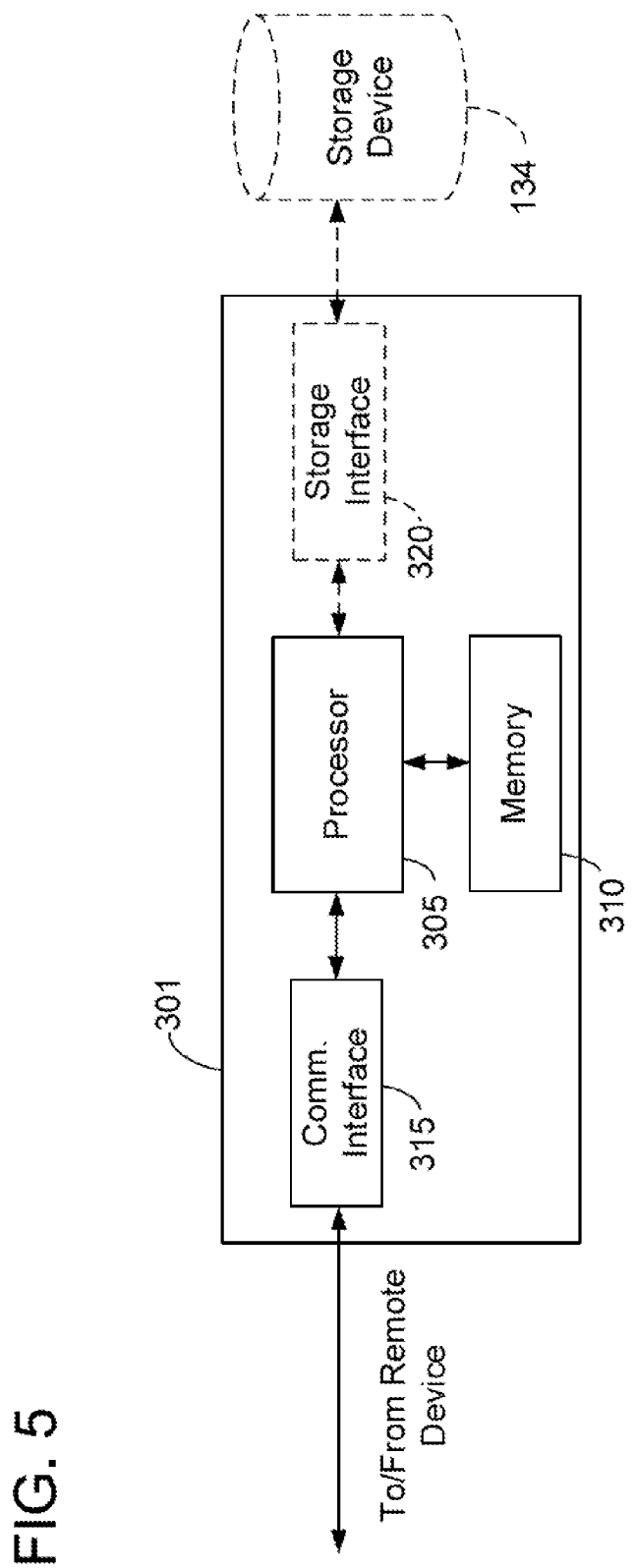
FIG. 5 illustrates an exemplary configuration of a server computing device, such as the server system shown in FIGS. 2 and 3.

FIG. 5 illustrates an exemplary configuration of a server computing device 301 such as server system 112 (shown in FIG. 2). Server computing device 301 may include, but is not limited to, database server 116, application server 124, web server 126, fax server 128, directory server 130, and mail server 132.

Server computing device 301 also includes a processor 305 for executing instructions. Instructions may be stored in a memory area 310, for example. Processor 305 may include one or more processing units (e.g., in a multi-core configuration).

Processor 305 is operatively coupled to a communication interface 315 such that server computing device 301 is capable of communicating with a remote device such as user computing device 202 or another server computing device 301. For example, communication interface 315 may receive requests from user computing device 114 via the Internet, as illustrated in FIG. 3.

Processor 305 may also be operatively coupled to a storage device 134. Storage device 134 is any computer-operated hardware suitable for storing and/or retrieving data. In some embodiments, storage device 134 is integrated in server computing device 301. For example, server computing device 301 may include one or more hard disk drives as storage device 134. In other embodiments, storage device 134 is external to server computing device 301 and may be accessed by a plurality of server computing devices 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Referring to FIGS. 4 and 5, a software application may operate at least in part by exchanging data (e.g., requests and responses) between user computing device 202 and server computing device 301. For example, a "client side" software component executed by user computing device 202 may request data stored in storage device 134 and/or may initiate a transaction (e.g., a payment transaction) through server computing device 301.

In some scenarios, the operator of server computing device 301 and/or user computing device 202 wishes to demonstrate existing or proposed behavior of such a software application. However, the operator may not wish to provide access to server computing device 301 solely for a software demonstration and/or may not be able to feasibly provide such access when and/or where the demonstration is performed. In other words, server system 112 (shown in FIG. 3), which processes payment transactions, may also provide numerous other functions used by a consumer (cardholder), a merchant, an acquirer, and/or an issuer. These functions may be implemented using hardware and/or software elements included within server system 112. In order to access these services, users 201, such as consumers, merchants, acquirers, and issuers, utilize user computing device 202 to communicate with server system 112. This client-server connection allows the user 201 to access the many services offered by server system 112.

In exemplary embodiments, user computing device 202 is programmed to present a software demonstration that includes a plurality of pages (e.g., displaying a variety of data) that mimic conversation and/or interaction between user computing device 202 and server computing device 301 without the need for access to server computing device 301. In some embodiments, all information and instructions for presenting the demonstration are included in a file system that is local to user computing device 202 (e.g., within memory area 210).

In some embodiments, the demonstration is defined by a script component, which includes computer-executable instructions for generating, manipulating, and navigating between the pages, as described in more detail below. These computer-executable instructions are executed by a computer system to create and present the demonstration. The script component and/or other components described below may inherit default behavior and/or data objects from a framework, which may include a core component.

Figure 6:
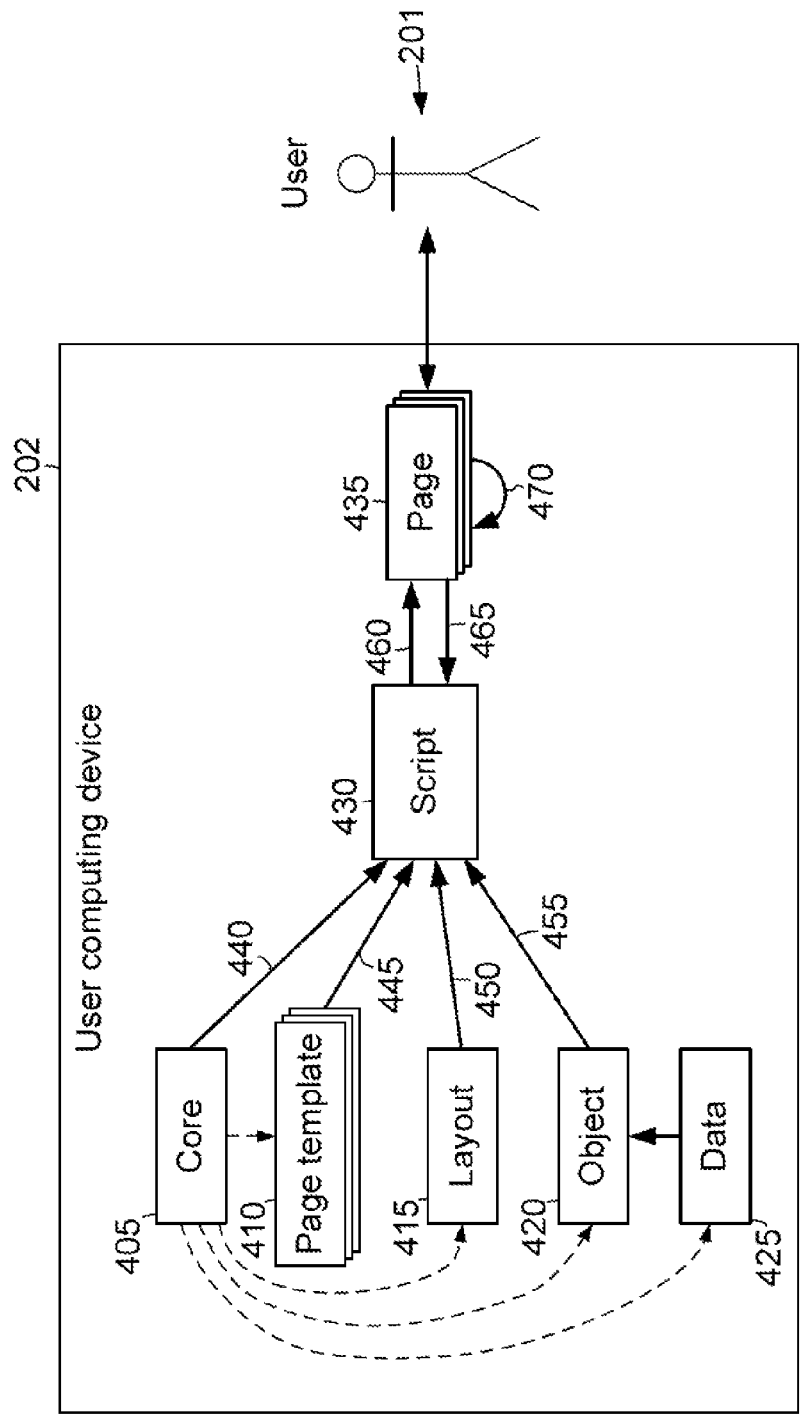
FIG. 6 is a block diagram of exemplary software components executed by the user computing device shown in FIG. 4.

FIG. 6 is a block diagram of exemplary software components executed by user computing device 202 (shown in FIG. 4). In exemplary embodiments, user computing device 202 includes a core component 405, a plurality of page templates 410, a layout component 415, an object component 420, a data component 425, and a script component 430. Script component 430 produces a plurality of pages 435 using core component 405, page templates 410, layout component 415, object component 420, and data component 425, as describe in more detail below.

Core component 405 includes definitions of functions, data structures, classes, and/or objects that are accessible to other components executed by user computing device 202. For example, core component 405 may define classes, and other components may create and interact with instances of such classes. Accordingly, multiple demonstrations may be quickly created by referencing core component 405 (e.g., in script component 430 and/or elsewhere) and specifying demonstration-specific features in the referencing component. In the exemplary embodiment, the functions, data structures, and other elements defined by core component 405 are imported 440 into script component 430. Similarly, the elements defined by core component 405 may also be referenced by and/or imported into any other components in user computing device 202.

Each page 435 corresponds to (e.g., is based on) a page template 410 that defines content (e.g., text, forms, and/or images) to be displayed in page 435. For example, page template 410 may be provided in Hyper Text Markup Language (HTML) format. Page template 410 may also include presentation information related to the content, such as one or more Cascading Style Sheets (CSS) definitions. The presentation information specifies the appearance (e.g., color and/or size) of content elements. In exemplary embodiments, page templates 410 are based on actual pages produced by fully implemented, server-provided software application.

Script component 430 reads 445 a page template 410 and manipulates content defined by page template 410. In some embodiments, script component 430 includes executable code (e.g., in the JavaScript language) that modifies the state of content elements, such as whether a collapsible form is expanded, and/or populates one or more content elements with data. For example, the executable code of script component 430 may copy data from object component 420 and/or data component 425 into the content defined by page template 410. Each page template 410 may be used to create multiple, different pages 435 within one demonstration and/or to create pages 435 within multiple demonstrations by manipulating the content of page template 410. In exemplary embodiments, script component 430 is executed by a web browser and manipulates the content of each page template 410 at least in part by accessing a document object model (DOM) that the web browser creates based on the page template 410.

User computing device 202 may display a description area with one or more pages 435 in the demonstration. A description area includes user instructions for entering values and/or navigating within the demonstration, descriptive text associated with one or more features illustrated by page 435, and/or any information that corresponds to the demonstration or the displayed page 435. In some embodiments, an element in the description area is associated with executable code that manipulates content in the displayed page 435, and this code is executed when the element is selected by the user. The content of the description area may be defined in a page template 410 and/or in script component 430.

User computing device 202 may also access 450 a layout component 415 to create the page. Layout component 415 specifies the position or arrangement of content elements within a page 435. For example, page 435 may include content from page template 410 and a description area, and layout component 415 may specify where the description area is displayed relative to the content. In some embodiments, layout component 415 defines a layout that is similar or identical to the layout of the software application being demonstrated.

Script component 430 may also retrieve 455 one or more object definitions from object component 420. Object definitions may be included in data component 425, and one or more data components 425 may be included in and/or referenced by object component 420. An object definition, when executed by user computing device 202, creates one or more data elements that are available for inclusion in page 435. For example, the object definition may reference one or more data files that include sample data objects (e.g., financial accounts and/or transactions) that represent information conventionally stored in a database. In addition, or alternatively, executable code (e.g., in script component 430 or in page template 410) may populate content elements in a page with values from one or more such sample data objects.

Accordingly, a plurality of pages may be dynamically created 460 by script component 430. For example, each page 435 may be created 460 when it is requested by a user 201. Generally, the presented page 435 includes at least one navigation element. Navigation elements may include, without limitation, a link, a button, an image, and/or an icon.

In a fully implemented application, selection of such a navigation element initiates a request to a remote server, which returns updated content, such as a new page or updated content for a portion of the presented page. In the demonstration, selection of the navigation element initiates 465 execution of executable code by script component 430 that mimics the behavior of a server. In addition, or alternatively, selection of an element in a page 435 may initiate 470 execution of code by the page 435 containing the selected element.

In exemplary embodiments, as part of creating 460 a first page 435, script component 430 modifies one or more navigation elements within the page 435 such that selection of the navigation elements initiates 465 the creation 460 and/or presentation of a second page 435 by script component 430. For example, script component 430 may include an ordered list of pages 435 that defines a linear navigation through the demonstration. In such an implementation, script component 430 may modify navigation elements to reference the subsequent page 435 in the ordered list.

Figure 7:
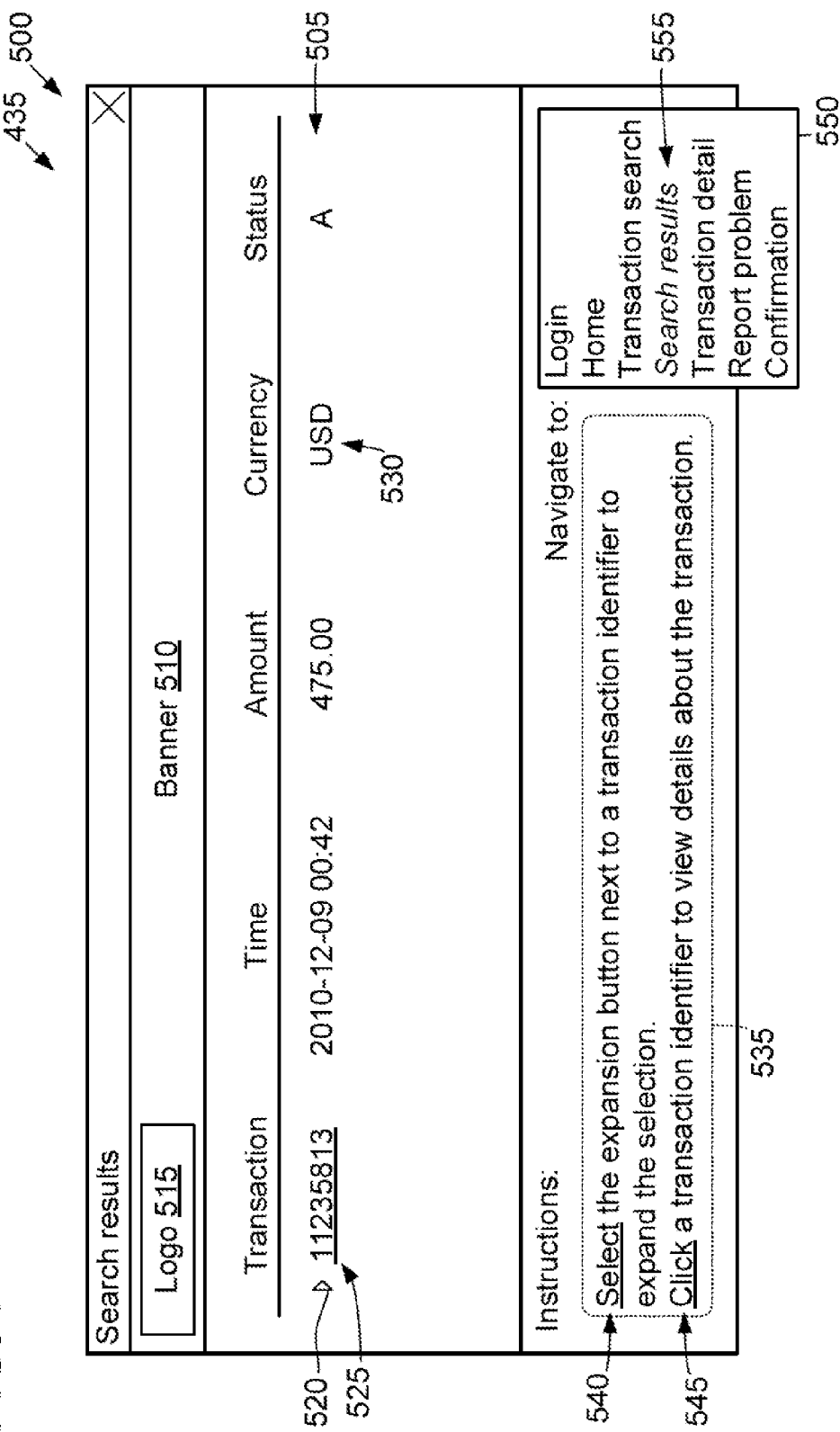
FIG. 7 is an exemplary search results page that may be created by the script component shown in FIG. 6.

FIG. 7 is an exemplary search results page 500 that may be created 460 (shown in FIG. 6) by script component 430 (shown in FIG. 6). Components shown in FIG. 7 that are identical to components shown in FIG. 6 will be identified using reference numbers that are the same as in FIG. 6. Referring to FIGS. 6 and 7, search results page 500 is an example of a page 435 that is created 460 by script component 430. In an exemplary embodiment, a search page 435 includes a navigation element in the form of a search button (not shown). When user 201 selects the search button, search page 435 initiates 465 execution of code by script component 430 that replaces search page 435 with search results page 500 that is based on a search results page template 410.

In one embodiment, the executable code populates the search results page 500 with data objects (e.g., from data component 425) that correspond to one or more values entered by user 201 in search page 435. In another embodiment, the executable code populates the search results page 500 with a predetermined set of data objects from data component 425, regardless of any values entered in the search page. Such an embodiment facilitates navigating between pages 435 of the demonstration without incurring delays caused by careful inspection and/or entry of data elements. In the exemplary embodiment, search results page 500 displays a financial transaction 505 that is defined by data component 425 and instantiated by object component 420.

As defined by layout component 415, financial transaction 505 is displayed below a banner 510 that includes a logo 515. Banner 510 and/or logo 515 may be selected based on the intended viewer of the software demonstration. For example, if the demonstration is created for a potential new customer, the banner 510 and other content in search results page 500 may include colors, fonts, and/or images associated with the customer. Similarly, logo 515 may be the logo of the potential new customer. Such embodiments facilitate demonstrating how the appearance of a software application can be adjusted for a customer (e.g., in a "co-branding" context).

Included in the display of financial transaction 505 are an expansion button 520 and a transaction identifier (ID) 525. Expansion button 520 is a page manipulation element. In response to selection of expansion button 520, search results page 500 and/or script component 430 modifies the appearance of search results page 500 (e.g., what portion of content in search results page 500 is displayed) without navigating to another page 435. In one embodiment, when expansion button 520 is selected, search results page 500 initiates 470 execution of code by search results page 500 that expands the information displayed for financial transaction 505. For example, search results page 500 may display non-abbreviated forms of data fields, such as currency 530. Alternatively, the selection may initiate 465 execution of the code by script component 430.

Transaction ID 525 is a navigation element that directs user 201 to another page 435. In the exemplary embodiment, when transaction ID 525 is selected, search results page 500 initiates 465 execution of executable code by script component 430 that directs user 201 to a transaction details page (not shown), in which details of financial transaction 505 are displayed. In some embodiments, search results page 500 includes a plurality of navigation elements. Script component 430 manipulates the navigation elements, such as by enabling and/or disabling the navigation elements. For example, a navigation element that refers to a page 435 not included in the demonstration may be disabled by script component 430. Script component 430 may also control the action(s) associated with navigation elements. In an exemplary embodiment, script component 430 modifies each navigation element in search results page 500 to be associated with same action, such as the creation 460 and/or presentation of a subsequent page 435 in a linear navigation.

Script component 430 also includes in search results page 500 a description area 535. In one embodiment, the content of description area 535 is defined in script component 430 and associated with search results page 500. In another embodiment, the content is defined in a page template 410. Description area 535 includes user instructions explaining how user 201 may interact with search results page 500.

Description area 535 also includes a first action link 540 that is associated with a page manipulation element (e.g., expansion button 520) and a second action link 545 that is associated with a navigation element (e.g., transaction ID 525). When first action link 540 is selected, search results page 500 initiates 470 execution of the same code that is initiated 470 when expansion button 520 is selected. For example, expanded information for financial transaction 505 may be displayed. When second action link 545 is selected, search results page 500 initiates 465 execution of the same code that is initiated 465 when transaction ID 525 is selected. For example, selection of second action link 545 may cause script component 430 to display a transaction details page. Accordingly, first action link 540 may be understood to be another page manipulation element, and second action link 545 may be understood to be another navigation element. Providing action links within description area 535 facilitates increasing the ease and/or speed with which user 201 may demonstrate features within a page 435 and/or advance from one page 435 to another page 435.

The progression from a search page to search results page 500, and then to a transaction details page may represent a portion of a linear navigation between pages 435 in the software demonstration. Linear navigation may be created by defining any number of pages 435 in script component 430 and linking the pages 435 through navigation elements (e.g., transaction ID 525) and executable code. For example, a series of pages 435 may be shown in succession as a navigation element is selected in each page 435.

Some embodiments also support non-linear navigation. In an exemplary embodiment, search results page 500 includes a navigation menu 550. Navigation menu 550 includes an ordered list of pages 435 in the software demonstration. Navigation menu 550 enables user 201 to navigate the pages 435 of the demonstration in a non-linear manner by selecting a page 435. In one embodiment, when a page is selected in navigation menu 550, script component 430 creates 460 the selected page 435 based on a corresponding page template 410 and replaces the previously displayed page 435 (e.g., search results page 500) with the selected page 435. In other embodiments, script component 430 has previously created 460 the selected page 435 and presents the page 435 when it is selected in navigation menu 550. Script component 430 also executes any executable code associated with the selected page 435, such that content within the selected page 435 is appropriately manipulated.

In exemplary embodiments, navigation menu 550 is displayed in each page 435 of the software demonstration. A currently displayed page 555 (e.g., search results page 500) may be graphically distinguished from other pages 435 in the software demonstration, enabling user 201 to determine which pages 435 are before currently displayed page 555 in the linear navigation and which pages 435 are after currently displayed page 555 in the linear navigation.

Accordingly, the software demonstration achieves the benefits of linear navigation, such as providing a dynamic illustration of software features that closely corresponds to a typical usage scenario, as well as the benefits of non-linear navigation, such as the ability to bypass pages and advance to pages of interest to a viewer. Further, these benefits are provided without a requirement for access to a remote computer system, such as a server.

Figure 8:
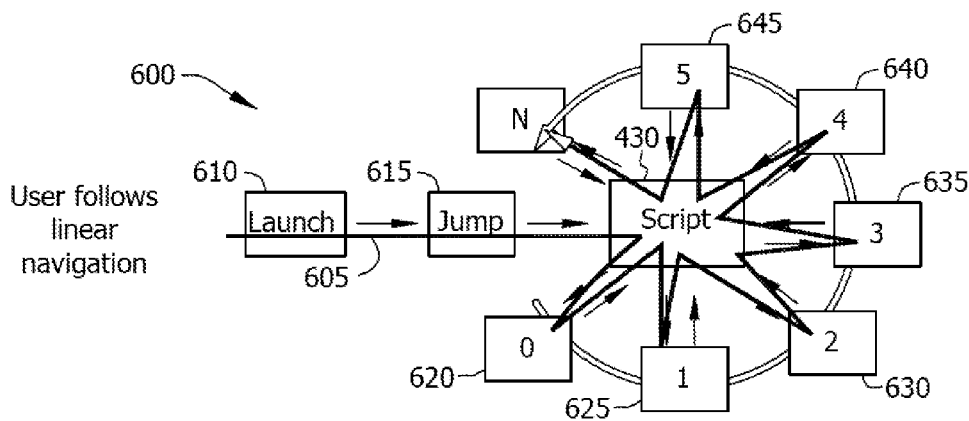
FIG. 8 is an illustration of linear navigation through a software demonstration implemented using the user computing device shown in FIG. 4.
Figure 9:
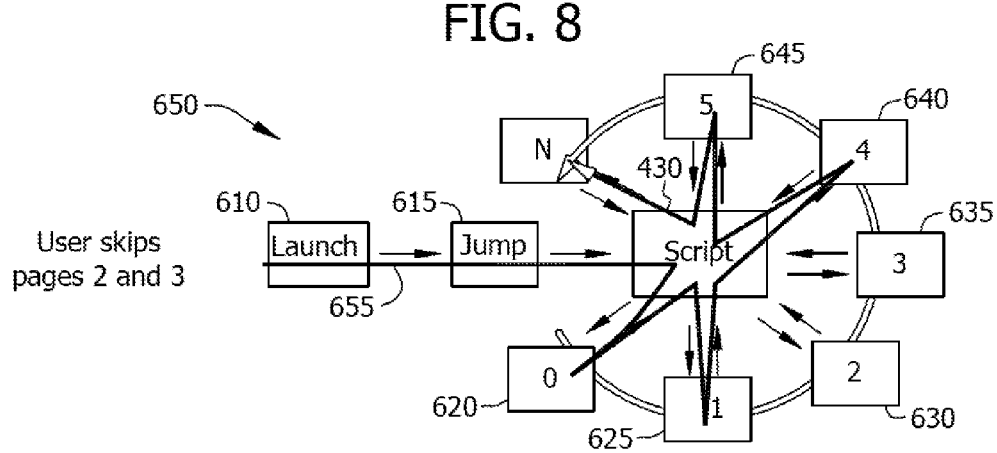
FIG. 9 is an illustration of linear navigation through a software demonstration with page bypassing implemented using the user computing device shown in FIG. 4.
Figure 10:
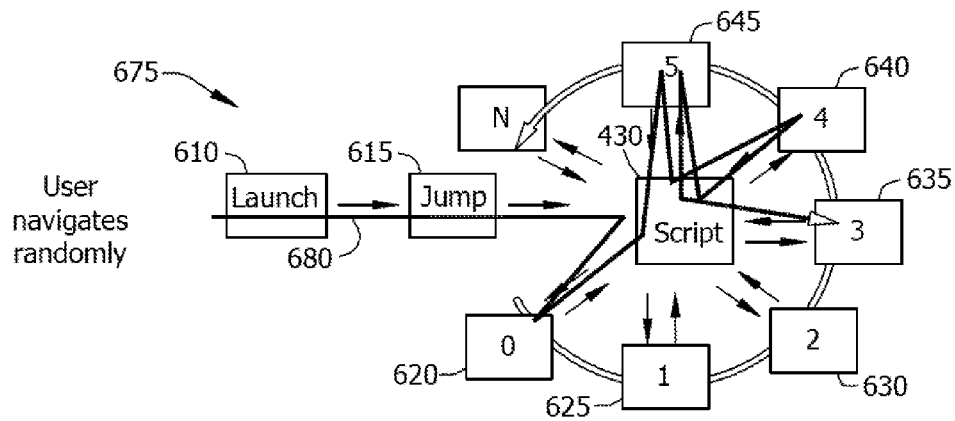
FIG. 10 is an illustration of random navigation through a software demonstration implemented using the user computing device shown in FIG. 4.

FIG. 8 is an illustration 600 of linear navigation through a software demonstration implemented using user computing device 202 (shown in FIG. 4). FIG. 9 is an illustration 650 of linear navigation through a software demonstration with page bypassing implemented using user computing device 202 (shown in FIG. 4). FIG. 10 is an illustration 675 of random navigation through a software demonstration implemented using user computing device 202 (shown in FIG. 4).

Referring to FIG. 8, illustration 600 includes a linear navigation path 605 representing navigation through the software demonstration by a user. The user is initially presented with a launch page 610. Launch page 610 may present a list including a plurality of software demonstrations available to the user. When the user selects a software demonstration, launch page 610 sets a variable identifying the selected demonstration and directs the user (e.g., by redirecting a web browser operated by the user) to a jump page 615. Jump page 615 sets a current page identifier representing a first page 620. For example, the current page identifier may be an index value that represents the position of first page 620 in an array of pages. In the exemplary embodiment first page 620 has an index value of zero because it is the first element in the array, a second page 625 has an index value of one, and so on.

Jump page 615 submits a navigation request to script component 430. With the current page identifier set to the identifier of first page 620, script component 430 presents first page 620 to the user. The user selects a navigation element within first page 620, which sets the current page identifier to the identifier of second page 625 (e.g., one) and submits a navigation request to script component 430. In response, script component 430 presents second page 625. Similarly, the user navigates to a third page 630, a fourth page 635, a fifth page 640, a sixth page 645, and so on.

Referring to FIG. 9, illustration 650 includes a bypass navigation path 655 representing navigation through the software demonstration by a user. As with illustration 600, the user is initially presented with launch page 610 and proceeds to jump page 615, then first page 620. The user navigates to second page 625 but does not proceed to third page 630. Rather, the user bypasses third page 630 and fourth page 635 and navigates to fifth page 640. For example, while viewing second page 625, the user may select fifth page 640 in a navigation menu (e.g., as described above with reference to FIG. 7).

When fifth page 640 is selected in navigation menu, the second page 625 sets the current page identifier to the identifier of fifth page 640 (e.g., an index value of four) and submits a navigation request to script component 430. In response, script component 430 presents fifth page 640. The user then resumes linear navigation of the software demonstration by proceeding to sixth page 645 and so on.

Referring to FIG. 10, illustration 675 includes a random navigation path 675 representing navigation through the software demonstration by a user. As described above, the user navigates from launch page 610 to jump page 615 and then to first page 620. From first page 620, the user selects sixth page 645 in a navigation menu. The identifier of sixth page 645 (e.g., an index value of five) is set as the current page identifier, and a navigation request is submitted to script component 430. In response, script component 430 presents sixth page 645 to the user.

The user again navigates via the navigation menu, selecting fifth page 640. When presented with fifth page 640, the user returns to sixth page 645. For example, the user may select sixth page using the navigation menu or may select a navigation element in fifth page 640. The user then navigates to fourth page 635 via the navigation menu.

As described above, providing non-linear navigation through a software demonstration enables a user to either advance through the pages of the demonstration in a manner similar to typical usage (e.g., simulating the performance of a sequence of operations), or to immediately advance to one or more pages of interest.

Figure 11:
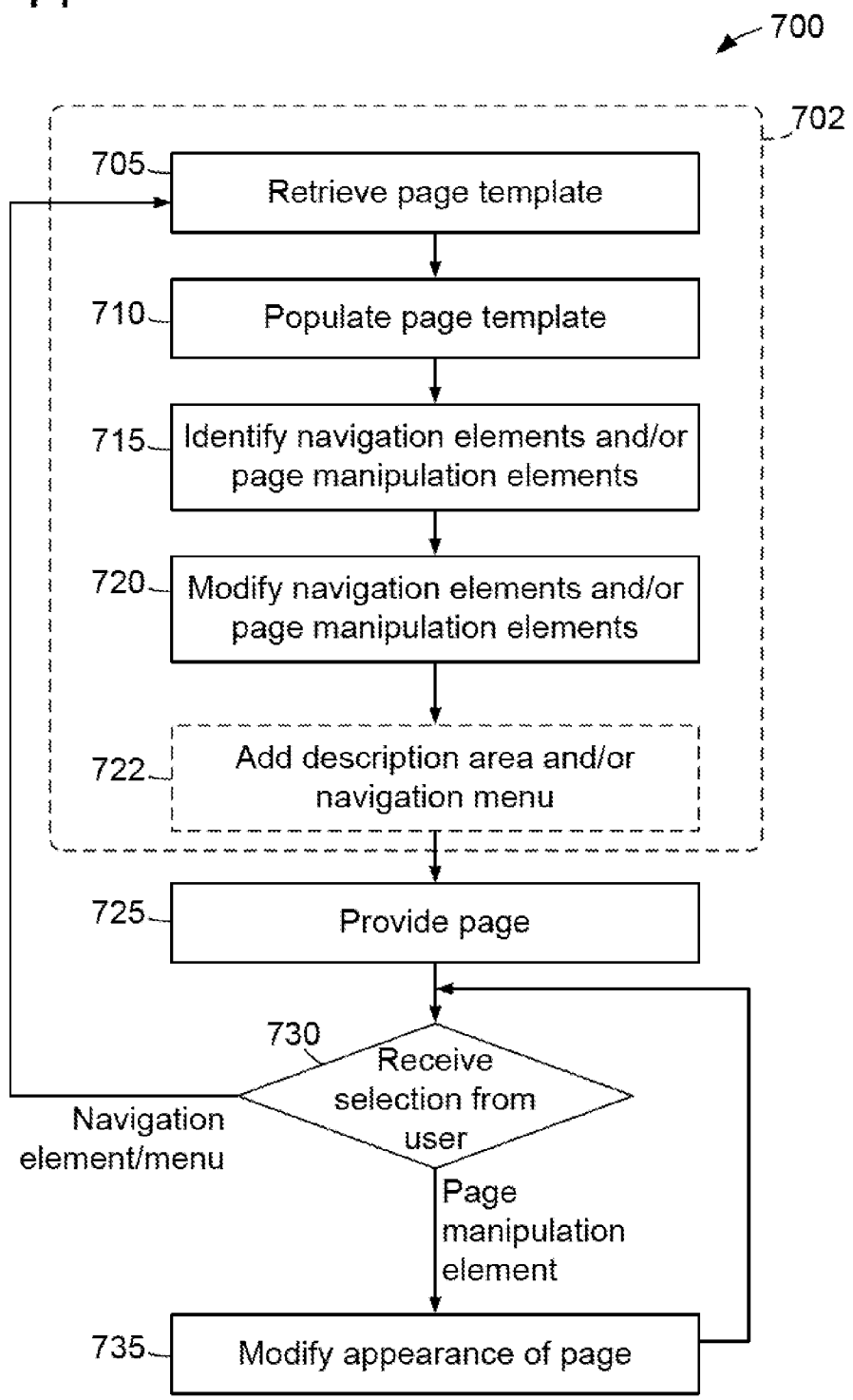
FIG. 11 is a flowchart of an exemplary process for demonstrating a software application using the user computing device shown in FIG. 4.

FIG. 11 is a flowchart of an exemplary process 700 for demonstrating a software application using a user computing device 202 (shown in FIG. 4). Referring to FIGS. 4 and 11, in exemplary embodiments, memory area 210 stores a plurality of page templates, each of which corresponds to a user interface (e.g., one or more pages) provided and/or produced by a software application executed by a server computing device 301 (shown in FIG. 5). Memory area 210 also stores an ordered list of demonstration pages. The sequence of pages in the ordered list defines a linear navigation through the software demonstration, as described above with reference to FIGS. 8-10.

User computing device 202 creates 702 a first demonstration page based on a first page template that corresponds to the first demonstration page. In an exemplary embodiment, processor 205 creates 702 the first demonstration page at least in part by retrieving 705 the corresponding page template from memory area 210 and populating 710 the page template. For example, the page template may be populated 710 with one or more data objects that are also stored in memory area 210. In some embodiments, data objects used to populate 710 the page template are defined by object component 420 and/or data component 425 (both shown in FIG. 6).

Processor 205 identifies 715 navigation elements and/or page manipulation elements in the first demonstration page. For example, a navigation element may include a button provided by the page template and/or a link that corresponds to a data object (e.g., transaction ID 525, shown in FIG. 7) used to populate 710 the page template. Navigation elements and/or page manipulation elements within the page template may be elements that, when selected in a server-provided software application, initiate a request to a server computing device.

In exemplary embodiments, processor 205 identifies 715 navigation elements and/or page manipulation elements based on an element type (e.g., an "input" element or an "anchor" element), an element attribute (e.g., an input element with a type attribute of "button"), an element identifier (e.g., a predetermined identifier string or substring), and/or any other aspect of an element that enables processor 205 to distinguish a navigation element and/or page manipulation element from elements other than navigation elements and/or page manipulation elements.

Processor 205 modifies 720 one or more identified navigation elements and/or page manipulation elements to refer to a second demonstration page that immediately follows the first demonstration page in the linear navigation of the software demonstration. In some embodiments, processor 205 modifies an identified element by associating executable code with the element. For example, processor 205 may set an "onclick" attribute of an HTML navigation element to refer to a page navigation function provided by script component 430

(shown in FIG. 6) and an identifier (e.g., an index value) of the second demonstration page. Similarly, the "onclick" attribute of an HTML page manipulation element may be set to refer to a page manipulation function provided by a corresponding page template 410 (shown in FIG. 6) and/or by script component 430. Notably, because the navigation elements and page manipulation elements are associated with executable code stored in memory area 210, selection of such elements will not initiate a request to another computing device.

After the first demonstration page is created 702, user computing device 202 provides 725 the first demonstration page to a user. For example, media output component 215 may display the first demonstration page. In exemplary embodiments, providing 725 a demonstration page includes rendering the demonstration page using a web browser. It should be noted that elements within a demonstration page may be modified 720 as the demonstration page is provided 725 to the user (e.g., while the demonstration page is displayed).

User computing device 202 receives 730 a selection of an element (e.g., a navigation element or a page manipulation element) within the first demonstration page from a user. For example, the user may select an element via an input device 220. In response to the selection of the navigation element, processor 205 executes the executable code that was previously associated with the element when modifying 720 the elements.

If the selected element is a navigation element, processor 205 executes the page navigation function provided by script component 430, referencing the identifier of the second demonstration page, to create 702 the second demonstration page, provide 725 the second demonstration page, and receive 730 a selection of an element within the second demonstration page. If the selected element is a page manipulation element, processor 205 executes the page manipulation function associated with the page manipulation element, thereby modifying 735 the appearance of the first demonstration page. For example, a portion of the first demonstration page may be expanded and/or collapsed, as described above with reference to FIG. 7. Computing device 202 then waits to receive 730 another selection of an element within the first demonstration page.

In some embodiments, processor 205 adds 722 a description area and/or a navigation menu (e.g., as described above with reference to FIG. 7) when creating 702 a demonstration page. The description area may include one or more action links that correspond to elements within the demonstration page. In response to the selection of an action link, processor 205 executes the executable code that is associated with the element corresponding to the selected action link. Accordingly, an action link associated with a navigation element may be considered another navigation element, and an action link associated with a page manipulation element may be considered another page manipulation element.

In response to a selection of a demonstration page in a navigation menu, processor 205 executes the navigation function provided by script component 430, referencing the identifier of the selected demonstration page, to create 702 the selected demonstration page, provide 725 the selected demonstration page, and receive 730 a selection of an element within the selected demonstration page.

Process 700 is described above with reference to a first demonstration page and a second demonstration page. However, process 700 may be performed with any quantity of demonstration pages. For example, a user may advance from the second demonstration page to a third demonstration page that follows the second demonstration page in the ordered list of demonstration pages. Further, the user may select demonstration pages that are not adjacent to the currently displayed demonstration page within a navigation menu to bypass pages and/or navigate backwards through the ordered list, as described above with reference to FIGS. 9 and 10.

Embodiments described herein may be performed using a computer-based or computing-device-based operating environment as described below. A computer or computing device may include one or more processors or processing units, system memory, and some form of non-transitory computer-readable media. Exemplary non-transitory computer-readable media include flash memory drives, hard disk drives, digital versatile discs (DVDs), compact discs (CDs), floppy disks, and tape cassettes. By way of example and not limitation, computer-readable media comprise computer storage media and communication media. Computer storage media are non-transitory and store information such as computer-readable instructions, data structures, program modules, or other data. Communication media typically embody computer-readable instructions, data structures, program modules, or other data in a modulated data signal such as a carrier wave or other transport mechanism and include any information delivery media. Combinations of any of the above are also included within the scope of computer-readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

While the invention has been described in terms of various specific embodiments, those skilled in the art will recognize that the invention can be practiced with modification within the spirit and scope of the claims.

What is claimed is:

1. A method for demonstrating a software application having a plurality of demonstration pages, using a standalone computing device, the computing device in communication with a memory device, said method comprising:
    executing a scripting component by a processor of the standalone computing device, wherein the scripting component is configured to cause the standalone computing device, while the standalone computing device is not connected to a network, to perform the steps of:
        receiving a request from a user of the standalone computing device for a first demonstration page;
        retrieving a page template for the first demonstration page and populating the retrieved page template with data corresponding to the selected first demonstration page;
        identifying from the populated template at least one content element having at least a navigation element, and modifying the identified navigation element by associating executable code with the navigation element to refer to a second demonstration page, the associated executable code referencing at least an index position of the second demonstration page;
        updating a current page identifier based on an index position of the first demonstration page within an ordered list, and wherein the ordered list includes an array of indexed positions for the plurality of demonstration pages;
        displaying the first demonstration page to the user of the standalone computing device;
        receiving a selection of the navigation element within the first demonstration page from the user; and
        in response to the selection of the navigation element, executing the associated executable code and dynamically building by the standalone computing device the second demonstration page, updating the current page identifier with the index position of the second demonstration page, and providing the second demonstration page to the user.

2. A method according to claim 1, wherein the first demonstration page and second demonstration page are included in the ordered list of demonstration pages that defines a linear navigation, said method further comprising providing in the second demonstration page a navigation menu that includes the ordered list of demonstration pages.

3. A method according to claim 1, further comprising providing in the second demonstration page a description area that includes user instructions explaining how the user may interact with the second demonstration page.

4. A method according to claim 3, wherein the navigation element within the first demonstration page comprises a first action link, and said method further comprises:
    providing, in the description area of the second demonstration page, a second action link that represents a second navigation element within the second demonstration page, wherein the second action link is associated with a third demonstration page; and
    in response to a selection of the second action link that corresponds to the second navigation element, dynamically building by the computing device the third demonstration page and providing the third demonstration page to the user.

5. A method according to claim 1, wherein identifying the at least one content element comprises providing, using a layout component, at least one positional characteristic of the at least one content element.

6. A method according to claim 1, wherein retrieving a page template for the first demonstration page further comprises:
    retrieving at least one object definition from an object component, wherein the at least one object definition includes a data component to be displayed to the user; and
    updating the first demonstration page to include the data component.

7. A device for demonstrating a software application having a plurality of demonstration paces, said device comprising:
    a memory area for storing a plurality of page templates, wherein each page template corresponds to one or more pages produced by a software application when the software application is executed by a server computing device;
    a processor coupled to said memory area and programmed to execute a scripting component to configured to, while the device is not connected to a network, cause the processor to:
        receive a request from a user for a first demonstration page;
        retrieve a first page template of the plurality of page templates for the first demonstration page and populate the first page template with data corresponding to the selected first demonstration page;
        identify from the populated first page template at least one content element having at least a navigation element, and modify the identified navigation element by associating executable code with the navigation element to refer to a second demonstration page, the associated executable code referencing at least an index position of the second demonstration page;
        update a current page identifier based on an index position of the first demonstration page within an ordered list, and wherein the ordered list includes an array of indexed positions for the plurality of demonstration pages;
        receive a selection of the navigation element within the first demonstration page from the user; and
        in response to the selection of the navigation element, execute the associated executable code and dynamically build the second demonstration page, update the current page identifier with the index position of the second demonstration page; and a media output component coupled to said processor and configured to display the first demonstration page and the second demonstration page.

8. A device in accordance with claim 7, wherein said processor is further programmed to modify the first demonstration page such that the second demonstration page is displayed without requesting data from the server computing device.

9. A device in accordance with claim 7, wherein said processor is further programmed to provide in the first demonstration page a description area that includes user instructions explaining how the user may interact with the first demonstration page.

10. A device in accordance with claim 9, wherein said processor is further programmed to:
provide in the description area an action link that represents the navigation element; and
in response to a selection of the action link, display the second demonstration page via said media output component.

11. A device in accordance with claim 9, wherein the first demonstration page includes a page manipulation element associated with executable code for modifying an appearance of the first demonstration page, and said processor is further programmed to:
provide in the description area an action link that represents the page manipulation element; and
in response to a selection of the action link, execute the executable code that is associated with the page manipulation element to change the appearance of the first demonstration page.

12. A device in accordance with claim 9, wherein the navigation element within the first demonstration page comprises a first action link provided in the description area of the first demonstration page, and said processor is further programmed to:
provide, in a description area of the second demonstration page, a second action link that represents a second navigation element within the second demonstration page, wherein the second action link is associated with a third demonstration page; and
in response to a selection of the second action link, dynamically build the third demonstration page and display the third demonstration page to the user via said media output component.

13. A device in accordance with claim 7, wherein said processor is further programmed to modify the at least one content element using a layout component, wherein the layout component specifies at least one positional characteristic of the at least one content element.

14. A device in accordance with claim 7, wherein said processor is further programmed to:
retrieve at least one object definition from an object component, wherein the at least one object definition includes a data component to be displayed to the user; and
update the first demonstration page to include the data component.

15. A non-transitory computer-readable medium that includes computer-executable instructions for demonstrating a software application having a plurality of demonstration pages, said computer-executable instructions configured to cause a computer that is not connected to a network to:
retrieve from a memory area an ordered list of demonstration pages, wherein the ordered list includes a first demonstration page and a second demonstration page subsequent to the first demonstration page, each demonstration page in the ordered list is associated with a page template that is stored in the memory area, and wherein the first demonstration page represents a user interface provided by the software application when the software application is executed by a remote computing device;
receive a request from a user for the first demonstration page;
retrieve a first page template for the first demonstration page and populate the retrieved page template with data corresponding to the selected first demonstration page;
identify from the populated template at least one content element having at least a navigation element, and modify the identified navigation element by associating executable code with the navigation element to refer to the second demonstration page, the associated executable code referencing at least an index position of the second demonstration page;
update a current page identifier based on an index position of the first demonstration page within the ordered list, and wherein the ordered list further includes an array of indexed positions for the plurality of demonstration pages;
display the first demonstration page; and
in response to a selection of the navigation element in the first demonstration page, execute the associated executable code and dynamically build the second demonstration page based on a second page template, update the current page identifier with the index position of the second page, and display the second demonstration page.

16. A computer-readable medium according to claim 15, wherein said computer-executable instructions are further configured to cause the computer to:
retrieve from the memory area user instructions explaining how the user may interact with the first demonstration page; and
display in the first demonstration page a description area that includes the user instructions.

17. A computer-readable medium according to claim 16, wherein said computer-executable instructions are further configured to cause the computer to:
provide in the description area an action link that represents the navigation element; and
in response to a selection of the action link, display the second demonstration page.

18. A computer-readable medium according to claim 15, wherein said computer-executable instructions are further configured to instruct a cause the computer to:
specify at least one positional characteristic of the at least one content element; and
modify the at least one content element based at least in part on the at least one positional characteristic.

19. A computer-readable medium according to claim 15, wherein said memory further comprises, at least one object definition including a data component to be displayed to a user, wherein said computer-executable instructions are further configured to cause the computer to:
retrieve the at least one object definition; and
update the first demonstration page to include the data component.

* * * * *